United States Patent
Doncov et al.

(10) Patent No.: US 7,021,696 B2
(45) Date of Patent: Apr. 4, 2006

(54) CONVERTIBLE TOP LATCH

(75) Inventors: Stephen A. Doncov, Trenton, MI (US); Todd Schartner, Flat Rock, MI (US)

(73) Assignee: ASC Incorporated, Southgate, MI (US)

( * ) Notice: Subject to any disclaimer, the term of this patent is extended or adjusted under 35 U.S.C. 154(b) by 0 days.

(21) Appl. No.: 10/298,271

(22) Filed: Nov. 14, 2002

(65) Prior Publication Data

US 2004/0094988 A1 May 20, 2004

(51) Int. Cl.
*B60J 7/185* (2006.01)

(52) U.S. Cl. .................................. 296/121; 292/DIG. 5
(58) Field of Classification Search .................. 296/121, 296/224; 292/DIG. 5, 25, 26, 29, 96, 100
See application file for complete search history.

(56) References Cited

U.S. PATENT DOCUMENTS

| | | |
|---|---|---|
| 1,056,333 A | 3/1913 | Hill |
| 1,174,366 A | 3/1916 | Van Den Plas |
| 1,269,311 A | 6/1918 | Rixon |
| 1,831,494 A | 11/1931 | Hynes et al. |
| 1,856,531 A | 5/1932 | Berg |
| 1,892,512 A | 12/1932 | Kemp |
| 1,905,814 A | 4/1933 | Orlow |
| 1,929,371 A | 10/1933 | Hamilton |
| 2,007,873 A | 7/1935 | Paulin |
| 2,201,330 A | 5/1940 | Wernig et al. |
| 2,360,524 A | 10/1944 | Simpson |
| 2,372,583 A | 3/1945 | Keller |
| 2,468,251 A | 4/1949 | Wiederman |
| 2,486,905 A | 11/1949 | Ackermans |
| 2,560,459 A | 7/1951 | Lundbert et al. |
| 2,570,260 A | 10/1951 | Milhan |
| 2,570,261 A | 10/1951 | Milhan |

(Continued)

FOREIGN PATENT DOCUMENTS

| | | |
|---|---|---|
| DE | 805229 | 5/1951 |
| DE | 1505721 | 7/1970 |
| DE | 1 755 619 | 8/1971 |
| DE | 44 15 969 A1 | 11/1996 |
| EP | 0 188 774 | 12/1985 |
| EP | 0 429 006 A1 | 7/1992 |
| EP | 0 494 366 A2 | 7/1992 |
| GB | 352786 | 7/1931 |
| GB | 536578 | 5/1941 |
| WO | WO/96/27509 | 3/1996 |

OTHER PUBLICATIONS

Exhibits A1–A4, 4–pages of photographs of Porsche 911 front header latch system (prior to Mar. 1994).
Exhibits B1–B3, 3–pages of photographs of Mercedes 500SL front header and tonneau cober cam and striker systems (prior to Mar. 1994).
Exhibits C1–C4, 4–pages of photographs of BMW 318i convertible roof latch, prior Oct. 28, 1998.
Exhibits D1–D4, 4–pages of photographs of 2000 Model Year, Mercedes SLK Convertible Top Latch Mechanism.
Exhibit E, Manual of Latch Handle and Lock Assembly used in a convertible roof for the Geo Metro (on or before 1992).
Exhibit F, Drawing of latch assembly used in a convertible roof for a Geo Tracker (on or before 1992).

*Primary Examiner*—Joseph D. Pape
(74) *Attorney, Agent, or Firm*—Harness, Dickey & Pierce, P.L.C.

(57) ABSTRACT

A convertible top latch employing a linkage assembly and a driving mechanism is disclosed. The linkage assembly can be positioned on-center or over-center in a closed position. The linkage assembly can have an adjustable link. At least one link can remain the same and/or the latch member can move the same distance regardless of the linkage assembly being operated by a powered or manual actuator. A damping member can dampen movement of the top latch. The manual actuator can be biased to a specific orientation.

53 Claims, 12 Drawing Sheets

U.S. PATENT DOCUMENTS

| | | |
|---|---|---|
| 2,586,648 A | 2/1952 | Hale et al. |
| 2,596,355 A | 5/1952 | Ackermans |
| 2,674,480 A | 4/1954 | Vigmostad |
| 2,709,621 A | 5/1955 | Votypka et al. |
| 2,753,202 A | 7/1956 | Smith et al. |
| 2,785,914 A | 3/1957 | Thomas et al. |
| RE24,375 E | 4/1957 | Thompson, III |
| 2,831,718 A | 4/1958 | Hallek et al. |
| 2,852,292 A | 9/1958 | Galla |
| 2,856,231 A | 10/1958 | Zeman |
| 2,879,988 A | 3/1959 | Klisch |
| 2,886,364 A | 5/1959 | Smith |
| 2,916,327 A | 12/1959 | Gilson |
| 2,926,943 A | 3/1960 | Leslie et al. |
| 2,935,350 A | 5/1960 | Bestrom |
| 3,004,788 A | 10/1961 | Dully et al. |
| 3,089,719 A | 5/1963 | Csizmansky |
| 3,135,541 A | 6/1964 | Kwasek |
| 3,151,375 A | 10/1964 | Schevenell |
| 3,266,838 A * | 8/1966 | Heincelman ................ 296/121 |
| 3,353,864 A | 11/1967 | Antaya et al. |
| 3,362,740 A | 1/1968 | Burns |
| 3,375,037 A | 3/1968 | Hunt, Jr. |
| 3,400,526 A | 9/1968 | Bloss |
| 3,425,742 A * | 2/1969 | Rauber, Jr. ................ 296/121 |
| 3,443,834 A | 5/1969 | Andres |
| 3,586,360 A | 6/1971 | Perrotta |
| 3,712,665 A | 1/1973 | Klein |
| 3,751,949 A | 8/1973 | Castle |
| 3,845,976 A | 11/1974 | Peterson |
| 3,891,252 A | 6/1975 | Lehmann |
| 4,439,649 A | 3/1984 | Cecchi |
| 4,441,345 A | 4/1984 | Guarr |
| 4,470,277 A | 9/1984 | Uyeda |
| 4,537,440 A | 8/1985 | Brockaway et al. |
| 4,618,180 A | 10/1986 | Muscat |
| 4,664,436 A | 5/1987 | Eyb |
| 4,702,505 A | 10/1987 | Alexander |
| 4,712,828 A | 12/1987 | Albrecht |
| 4,720,133 A | 1/1988 | Alexander et al. |
| 4,746,163 A | 5/1988 | Muscat |
| 4,801,173 A | 1/1989 | Trenkler |
| 4,815,775 A | 3/1989 | Mertin et al. |
| 4,817,999 A | 4/1989 | Drew |
| 4,819,983 A | 4/1989 | Alexander et al. |
| 4,830,425 A | 5/1989 | Muscat |
| 4,830,426 A | 5/1989 | Schlachter et al. |
| 4,854,634 A | 8/1989 | Shiraishi et al. |
| 5,033,789 A | 7/1991 | Hayashi et al. |
| 5,035,463 A | 7/1991 | Kato et al. |
| 5,042,869 A | 8/1991 | Brin |
| 5,046,767 A | 9/1991 | Muscat |
| 5,052,740 A | 10/1991 | Bauer et al. |
| 5,058,939 A | 10/1991 | Miilu |
| 5,064,241 A | 11/1991 | Ohrle |
| 5,067,768 A | 11/1991 | Fischbach |
| 5,085,483 A | 2/1992 | Alexander |
| 5,088,777 A | 2/1992 | Ono et al. |
| 5,154,479 A | 10/1992 | Sautter, Jr. |
| 5,161,852 A | 11/1992 | Alexander et al. |
| 5,186,516 A | 2/1993 | Alexander et al. |
| 5,225,747 A | 7/1993 | Helms et al. |
| 5,267,769 A | 12/1993 | Bonne et al. |
| 5,269,586 A | 12/1993 | Hahn et al. |
| 5,284,378 A | 2/1994 | Sautter, Jr. |
| 5,301,987 A | 4/1994 | Tokarz et al. |
| 5,328,229 A | 7/1994 | Brandt et al. |
| 5,413,390 A | 5/1995 | Filippi |
| 5,429,400 A | 7/1995 | Kawaguchi et al. |
| 5,429,409 A | 7/1995 | Corder et al. |
| 5,435,615 A | 7/1995 | Schmitz |
| 5,489,146 A | 2/1996 | Fischbach |
| 5,533,777 A | 7/1996 | Kleemann et al. |
| 5,595,407 A | 1/1997 | ter Horst et al. |
| 5,620,226 A | 4/1997 | Sautter, Jr. |
| 5,624,149 A | 4/1997 | Tokarz |
| 5,645,309 A | 7/1997 | Graf |
| 5,678,881 A | 10/1997 | Tokarz |
| 5,722,704 A | 3/1998 | Chaput et al. |
| 5,755,467 A | 5/1998 | Dilluvio et al. |
| 5,772,275 A | 6/1998 | Tokarz |
| 5,904,394 A | 5/1999 | Dilluvio et al. |
| 6,033,008 A | 3/2000 | Mattila |
| 6,042,174 A | 3/2000 | Durrani |
| 6,155,614 A | 12/2000 | Lange |
| 6,158,786 A | 12/2000 | Droste et al. |
| 6,168,224 B1 | 1/2001 | Henn et al. |
| 6,182,527 B1 | 2/2001 | Sander |
| 6,213,534 B1 | 4/2001 | Mac Farland |
| 6,227,604 B1 | 5/2001 | Grace |
| 6,520,560 B1 * | 2/2003 | Schutt et al. ................ 296/121 |
| 2001/0005090 A1 | 6/2001 | Haberl et al. |

* cited by examiner

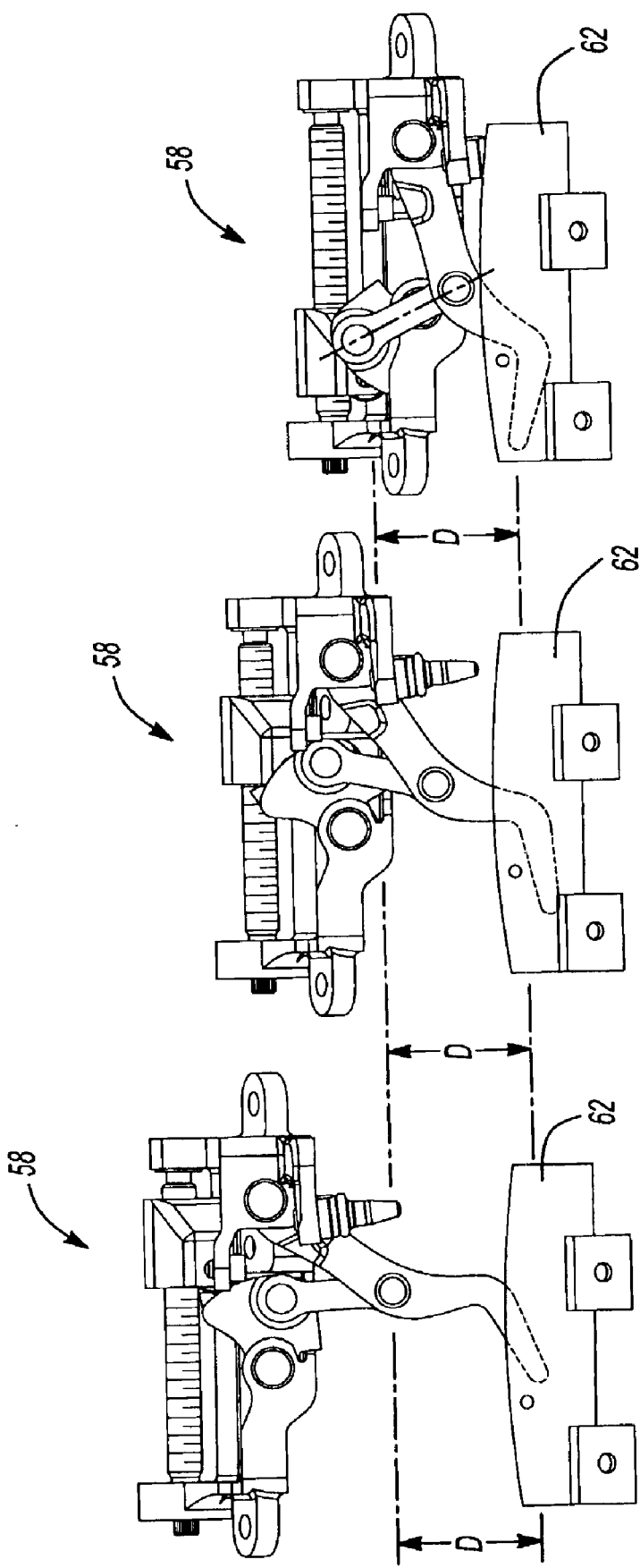

US 7,021,696 B2

CONVERTIBLE TOP LATCH

BACKGROUND AND SUMMARY OF THE INVENTION

This invention pertains generally to automotive vehicle roof systems and more specifically to a latching system for an automotive vehicle convertible roof.

Most convertible roofs have a latching device for disengageably securing a number one (or forwardmost) roof bow of a convertible roof to a stationary front header panel above a windshield. It is known to employ a centrally mounted handle or electric motor for linearly moving or rotating a pair of catches or hooks. Examples of such devices are disclosed in U.S. Pat. No. 5,755,467 entitled "Latching and Switch Operating System for a Convertible Roof" which issued to Dilluvio et al. on May 26, 1998; U.S. Pat. No. 5,678,881 entitled "Apparatus and Method for Securing a Convertible Roof to an Automotive Vehicle" which issued to Tokarz on Oct. 21, 1997; U.S. Pat. No. 5,269,586 entitled "Device for Lowering the Free End of a Vehicle Cover" which issued to Hahn et al. on Dec. 14, 1993; German Patent Publication No. 805 229 and United Kingdom Patent Publication No. 536,578.

In accordance with the present invention, the preferred embodiment of a convertible top latch employs a linkage assembly which is driven by a driving member. The driving member is operable to drive the linkage assembly between open and closed positions. In one aspect of the present invention, the linkage assembly is positioned substantially between an open and an on-center position inclusive when in a latched position. In another aspect of the present invention, at least one link of the linkage assembly has a link that is adjustable. In a further aspect of the present invention, the latch assembly has a latching member and at least one link that remain the same regardless of the latching assembly being operated by an automatically powered actuator or a manual actuator. In yet a further aspect of the present invention, the latch assembly has a latch member that moves a predetermined distance to latch a top stack mechanism. The predetermined distance is the same regardless of the latch assembly being operated by an automatically powered actuator or a manual actuator. In still another aspect of the present invention, there is a damping member that dampens movement of the latch assembly between the open and closed positions. In still another aspect of the present invention, the latch assembly is manually driven by a handle which is biased to a specific orientation.

The apparatus of the present invention is advantageous over traditional devices in that the present invention harnesses the mechanical advantage of a linkage mechanism with offset pivots driven by a crank. The positioning of a link in the latching assembly in a substantially on-center position results in little or no residual load on the latch assembly when in the latched position. By not having the link go over-center, extra motion of the latching assembly is avoided along with avoiding the extra force required to bring the link back from the over-center position. The adjustable link of the latch assembly allows for adjustment of the pull-down distance of the latch assembly without the use of shims. The latch assembly having a latch member and at least one link that remain the same regardless of being operated by a powered actuator or a manual actuator allows the convertible top employing the latch assembly to be provided as either a manually operated latching top or a power operated latching top. The ability of the latching member of the latch assembly to be moved the same predetermined distance regardless of being operated by a powered actuator or a manual actuator allows for a convertible top to employ a universal latch assembly and be offered with either a powered latching actuator or a manual latching actuator. The use of the universal latch assembly results in more commonality of the parts and requires less parts to be stocked to repair convertible roofs using such latch assemblies regardless of type of actuator used. The use of a damping member allows the latch assembly to be biased to a specific orientation and provides a controlled movement to the biased position. A latch assembly being operated by a handle that is biased toward a specific orientation allows for the handle to be self-retracting and minimize the packaging space required to store a top stack mechanism having such a handle. Additional advantages and features of the present invention will become apparent from the following description and appended claims, taken in conjunction with the accompanying drawings.

BRIEF DESCRIPTION OF THE DRAWINGS

FIGS. 7A–C are front views of the powered latch assembly of FIG. 4 showing an initial (or open) latching stage, an intermediate latching stage, and a final (or closed) latching stage, respectively;

DETAILED DESCRIPTION OF THE PREFERRED EMBODIMENTS

The following description of the preferred embodiments is merely exemplary in nature and is in no way intended to limit the invention, its application, or uses.

Figure 1:
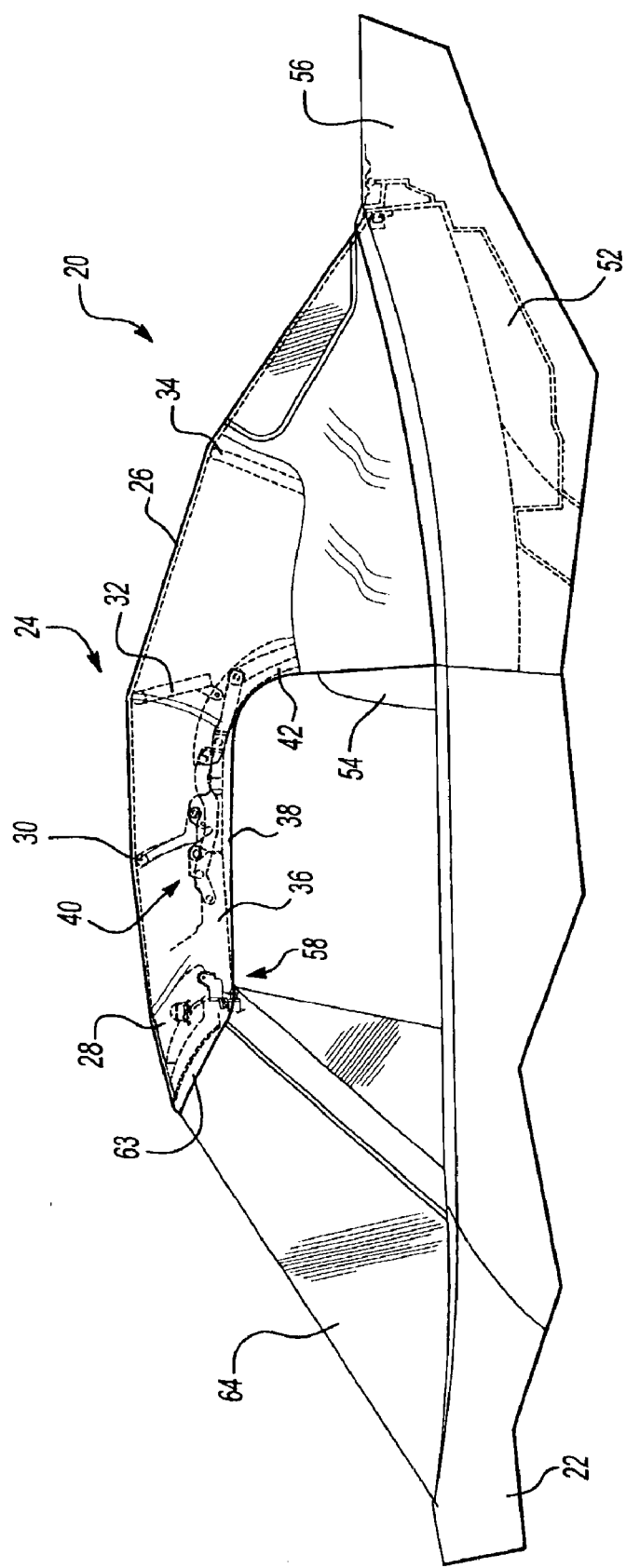
FIG. 1 is a fragmentary side elevation view of an automotive vehicle having a convertible roof employing a preferred convertible top latch of the present invention.
Figure 2:
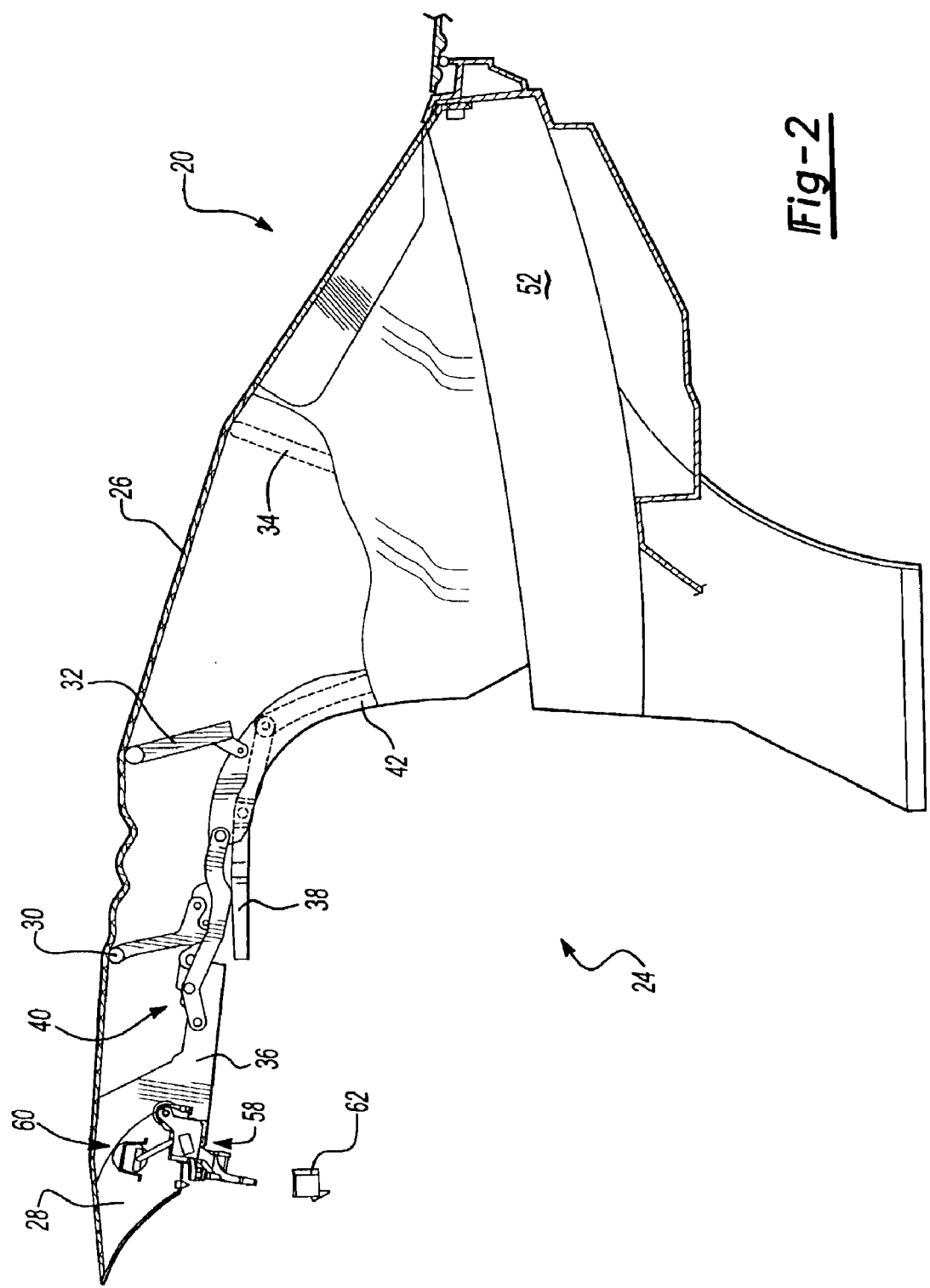
FIG. 2 is a fragmentary side elevation view of the vehicle of FIG. 1 employing the preferred latch, with the convertible roof in a position just prior to being fully closed.

As can be observed in FIGS. 1–2 a convertible roof 20 for an automotive vehicle 22 includes a top stack mechanism 24 and a pliable or flexible roof cover 26. The top stack mechanism 24 employs a forwardmost or number one roof bow 28, a number two roof bow 30, a number three roof bow 32, and a number four roof bow 34. Number one roof bow 28 is preferably integrally cast from an aluminum or magnesium alloy with a pair of front roof rails 36. A pair of center roof rails 38 are pivotably coupled to front roof rails 36 by control linkage assemblies 40. Furthermore, a pair of rear roof rails 42 are coupled to center roof rails 38. Rear roof rails 42 are also coupled to vehicle 22. Rear roof rail 42 is preferably die-cast and subsequently machined from an aluminum or magnesium alloy.

A top stack actuator (not shown) is operable to cause convertible roof 20 to be moved from a fully extended or raised position above a passenger compartment to a fully retracted or stowed position within a storage compartment or boot well 52. Boot well 52 is longitudinally located between an occupant seat 54 and a trunk 56. A latch assembly 58 and a driving assembly 60 that drives latch assembly 58 are attached to the forwardmost or number one roof bow 28. Latch assembly 58 includes a receptacle 62 which is attached to header 63 above a front windshield 64 of vehicle 22 and enables latch assembly 58 to latch convertible roof 20 to header 63, as described in more detail below. Receptacle 62 includes a sloped surface 66 that facilitates receiving a component of latch assembly 58 and one or more striker pins 68 that facilitate retaining convertible roof 20 latched to vehicle 22. Convertible roof 20, top stack mechanism 24, and latch assembly 58 are all generally symmetrically identical on both sides of vehicle 22. Therefore, only one side will be discussed hereinafter.

While latch assembly 58 and driving assembly 60 are shown as being used on top stack mechanism 24, it should be understood that latch assembly 58 and driving assembly 60 can be employed convertible roofs with different top stack mechanisms and on vehicles having more than one row of passenger seating and still be within the scope of the present invention. For example, latch assembly 58 and driving assembly 60 can be employed on the convertible tops disclosed in U.S. Pat. No. 5,161,852 entitled "Convertible Top With Improved Geometry" which issued to Alexander et al. and on U.S. Pat. No. 4,720,133 entitled "Convertible Top Structure" which issued to Alexander et al. both of which are incorporated herein by reference. Furthermore, latch assembly 58 and driving assembly 60 can be employed on an electrically or manually operated convertible roof 20. Additionally, the specific configuration and arrangement of the linkages of top stack mechanism 24 will vary depending upon the type of vehicle on which top stack mechanism 24 is designed to be employed. Accordingly, latch assembly 58 and/or driving assembly 60 can be used on convertible roofs having top stack mechanisms that vary from that shown in FIGS. 1 and 2 and still be within the scope of the present invention.

Figure 3A:
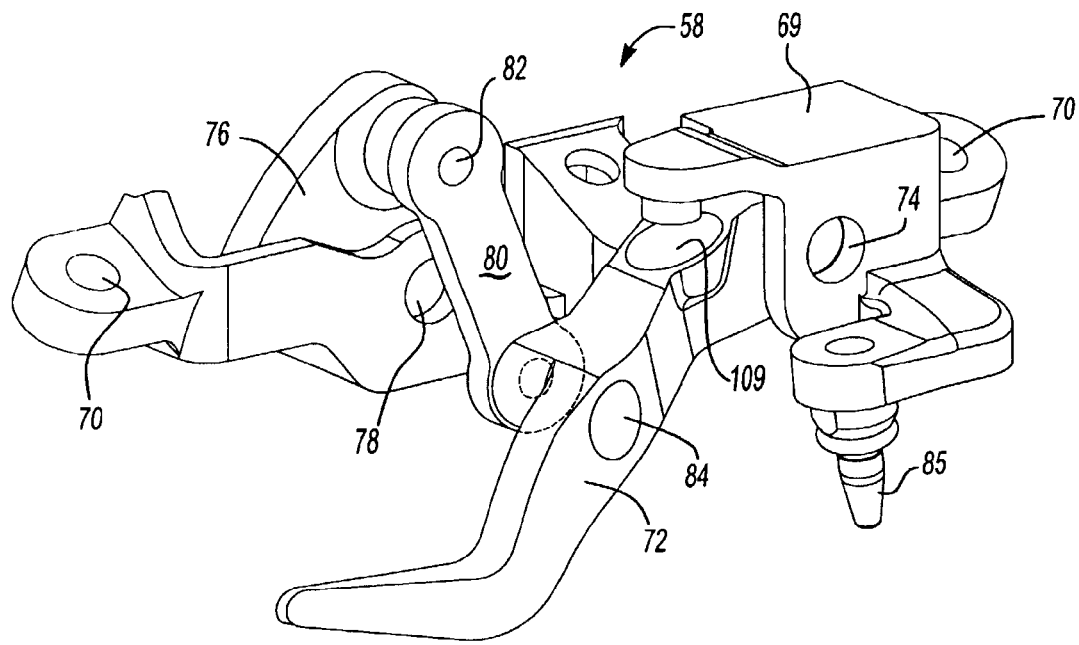
FIGS. 3A–B are perspective views of the convertible top latch according to the principles of the present invention in a preferred embodiment without an adjustable link and in an alternate embodiment with an adjustable link respectively.

Referring now to FIG. 3A, a preferred embodiment of latch assembly 58, according to the principles of the present invention is shown. Latch assembly 58 includes a bracket 69 configured to be attached to the forwardmost or number one roof bow 28. Bracket 69 includes bolt holes 70 to allow bracket 69 to be bolted to roof bow 28. However, it should be understood that bracket 69 can be mounted to roof bow 28 by other means, such as by riveting, welding or the like and still be within the scope of the invention. An end of a latching member 72, in the general shape of a hook, is pivotably attached to bracket 69 at pivot 74. A crank 76 is pivotably attached to bracket 69 at pivot 78. One end of a driving link 80 is pivotably attached to crank 76 at pivot 82 while an opposite end of driving link 80 is pivotably attached to an intermediate portion of latch member 72 at pivot 84. The pivotal connections between bracket 69, latch member 72, driving link 80, and crank 76 form a 4-bar mechanism defined by pivots 74, 84, 82, and 78. Latch assembly 58 is driven by causing crank 76 to rotate about pivot 78. Rotation of crank 76 about pivot 78 causes driving link 80 to drive latch member 72 in a pivotal motion about pivot 74 which enables latch assembly 58, in conjunction with receptacle 62, to latch convertible roof 20 to vehicle 22. Latch assembly 58 also has a guide pin 85 that extends outward from bracket 69. Guide pin 85 fits into opening 86 in receptacle 62. Guide pin 85 and opening 86 in receptacle 62 provide final alignment of convertible roof 20 relative to vehicle 22 when being latched to vehicle 22.

Figure 3B:
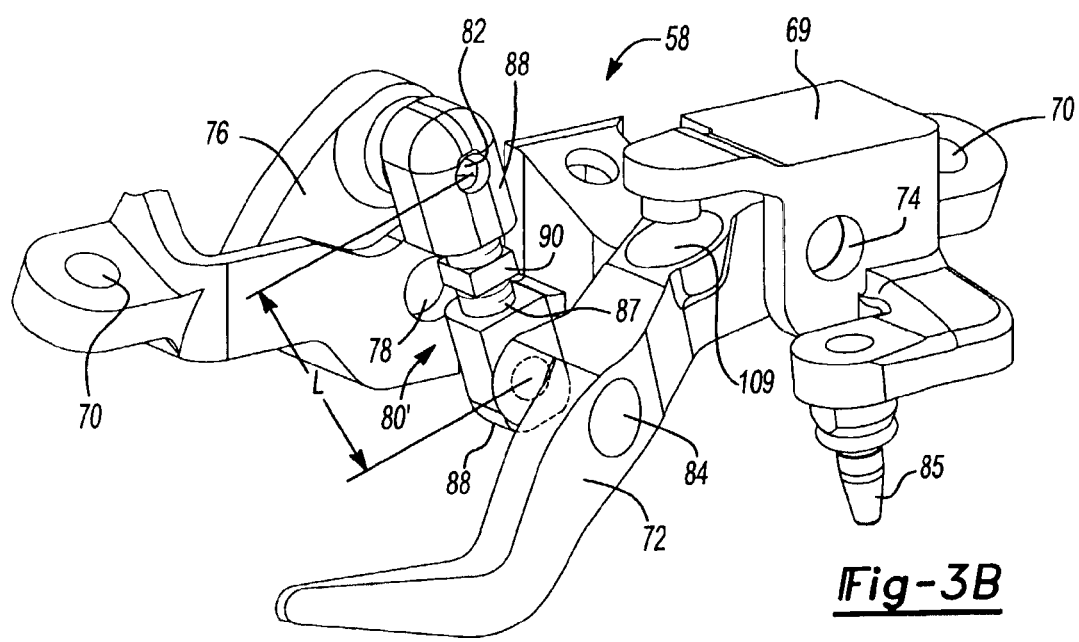
Figure 4:
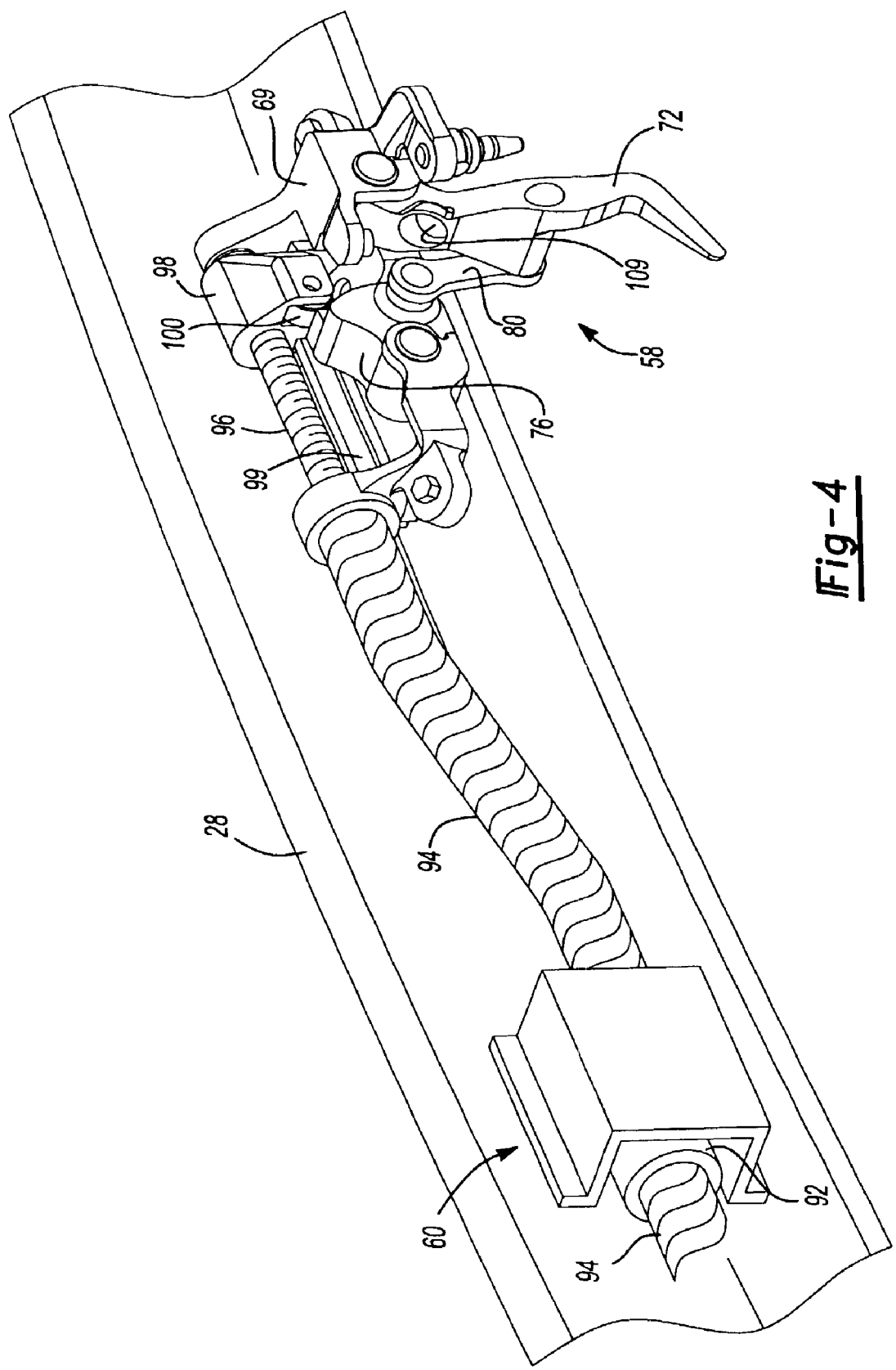
FIG. 4 is a simplified perspective view of a portion of a forwardmost roof bow of the convertible roof of FIG. 1, showing the first preferred embodiment of the convertible top latch driven by an automatically powered actuator according to the principles of the present invention.
Figure 5A:
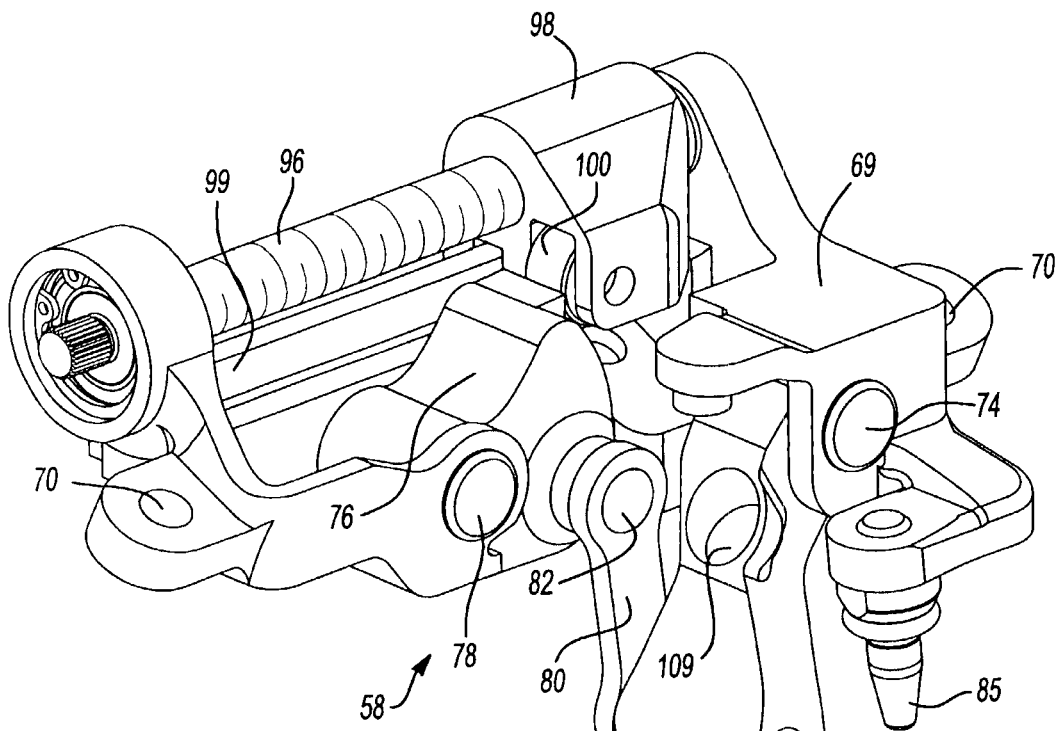
FIGS. 5A–C are respective perspective, front, and bottom views of the powered latch assembly of FIG. 4.
Figure 5B:
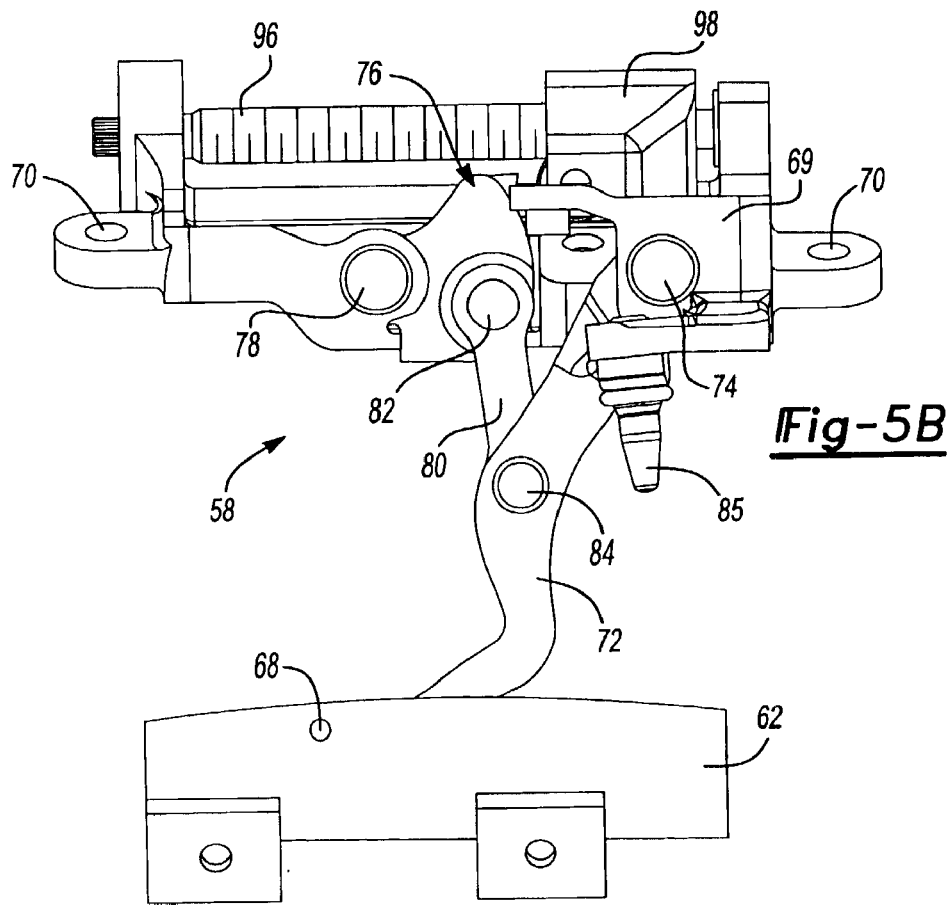
Figure 5C:
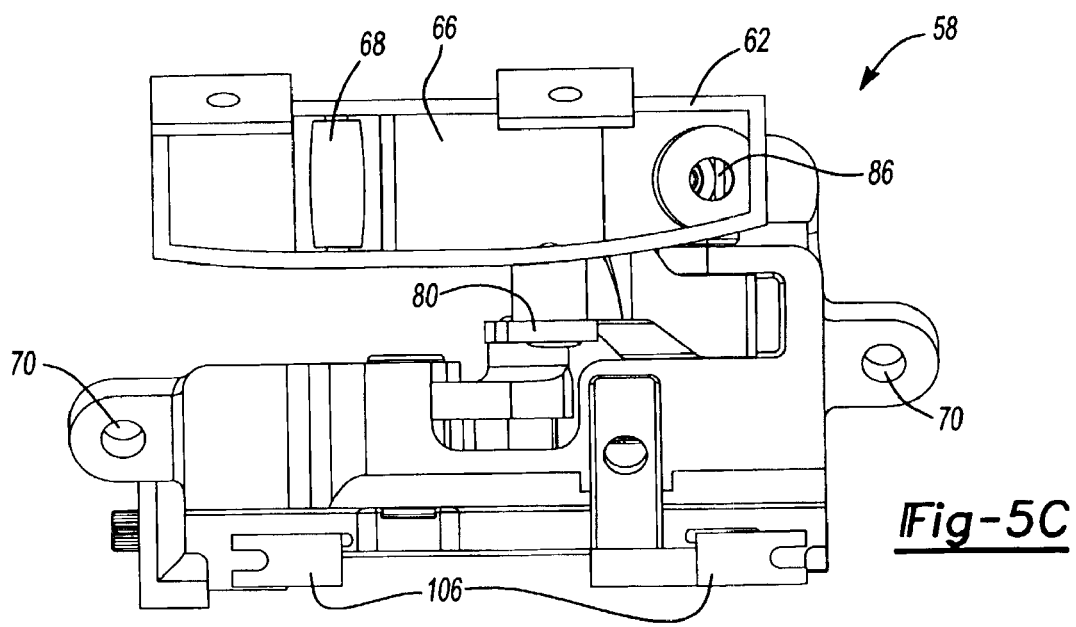
Figure 6A:
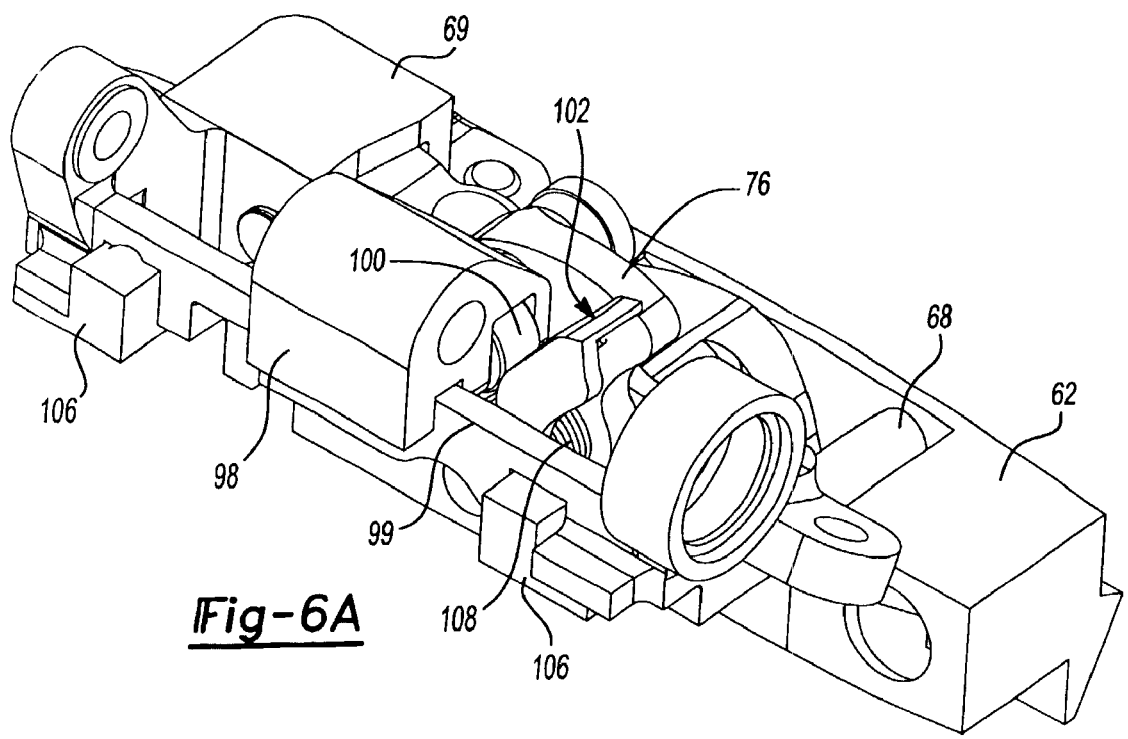
FIG. 6A is a reverse perspective view of the powered latch assembly of FIG. 5A with the lead screw removed and showing a backside of the crank member.
Figure 6B:
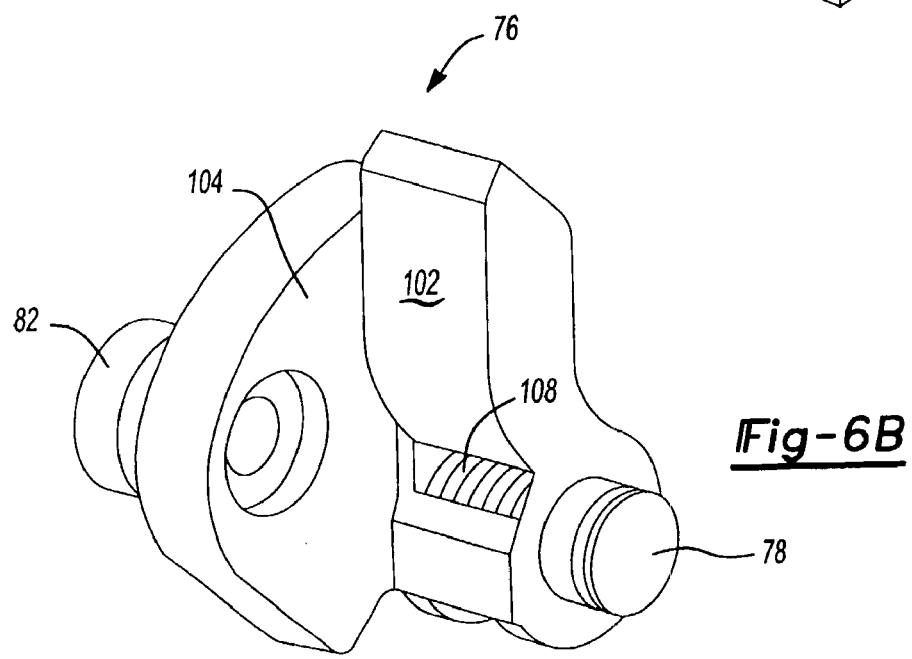
FIG. 6B is a perspective view of the crank member shown in FIG. 6A.

In an alternate embodiment, as shown in FIG. 3B, latch assembly 58 has a driving link 80' that is adjustable. That is, driving link 80' has a length L that can be adjusted to effect the distance D through which latch member 72 moves to latch convertible roof 20 to vehicle 22. Adjustable driving link 80', includes an elongated member 87 having opposite ends on which fittings 88 are attached. Fittings 88 are pivotably coupled to crank 76 and latch member 72 at pivots 82 and 84 respectively. The ends of elongated member 87 are threaded and fit in complementary female threaded recesses in fittings 88. A purchase 90, in this case in the form of a wrench flat, is provided on an intermediate portion of elongated member 87 to allow elongated member 87 to be rotated relative to fittings 88. Wrench flat 90 is preferably integral with or part of elongated member 87. Rotation of elongated member 87 relative to fittings 88 causes the distance the ends of elongated member 87 extend into fittings 88 to vary. That is, rotation of elongated member 87 in one direction will cause fittings 88 to move closer together and shorten the length L of adjustable driving link 80' while rotation in the opposite direction will cause fittings 88 to move further apart and increase length L. Thus, adjustable driving link 80' has a length L which is adjustable. An anti-rotation clip (not shown) is positioned over purchase 90 to prevent unwanted or accidental rotation of elongated member 87. The use of an adjustable driving link 80' allows the distance D latch member 72 moves to latch convertible roof 20 to vehicle 22 to be adjusted to provide a desired fit and tolerance between convertible roof 20 and vehicle 22. The use of adjustable driving link 80' eliminates the need to use shims between bracket 69 and the number one roof bow 28 to control the fit and finish of convertible roof 20 relative to vehicle 22 when latched. Thus, latch assembly 58 can be provided with a driving link 80, 80' which is of a fixed or adjustable length L. For brevity, latch assembly 58 will be further shown and described as having driving link 80, however, it should be understood that driving link 80 and adjustable driving link 80' are interchangeable. Thus, adjustable driving link 80' can be substituted wherever driving link 80 is referenced and/or shown.

Figure 8:
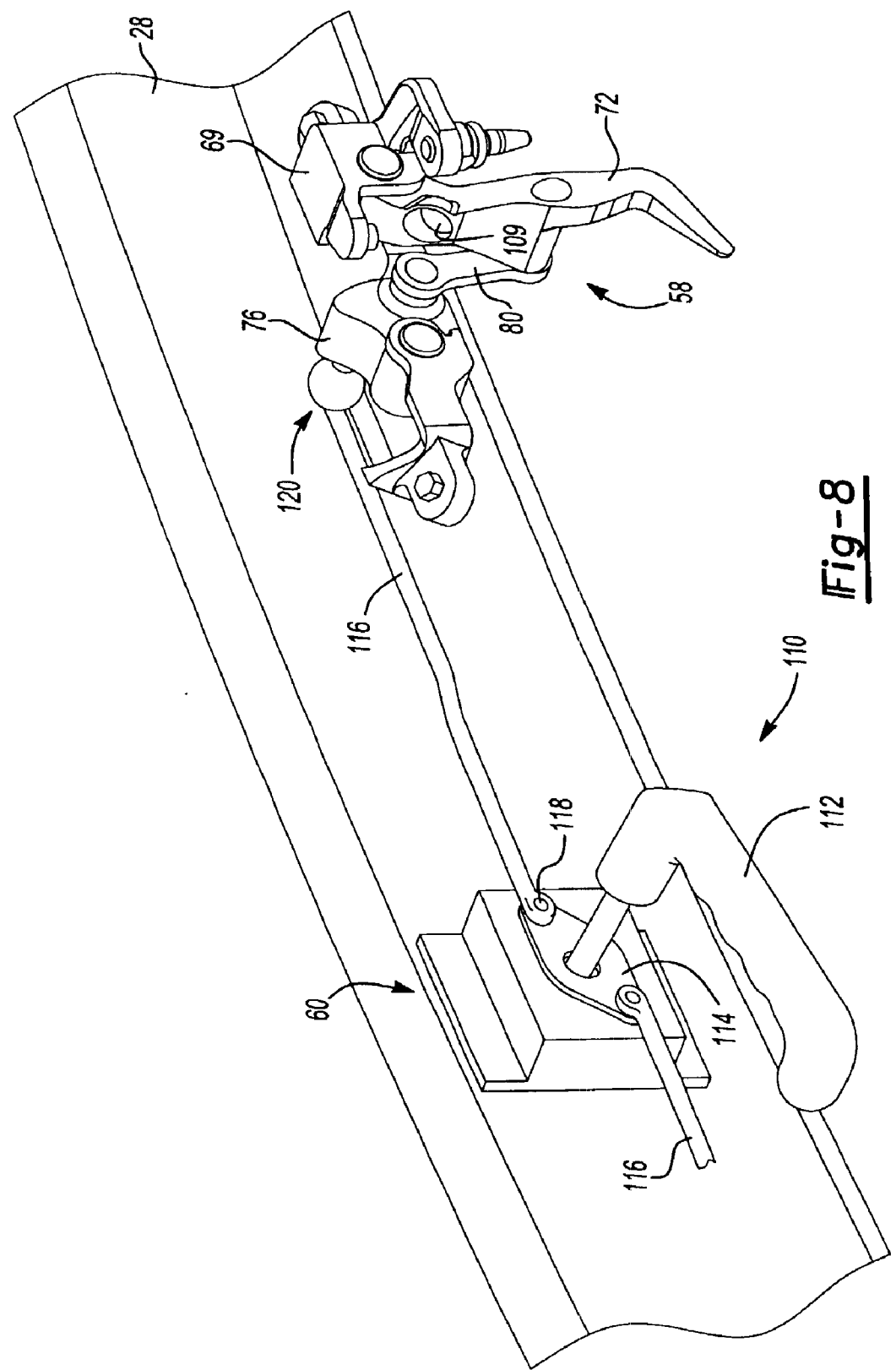
FIG. 8 is a simplified perspective view of a portion of a forwardmost roof bow of the convertible roof of FIG. 1, showing the second preferred embodiment of the convertible top latch driven by a manual actuator according to the principles of the present invention.
Figure 9A:
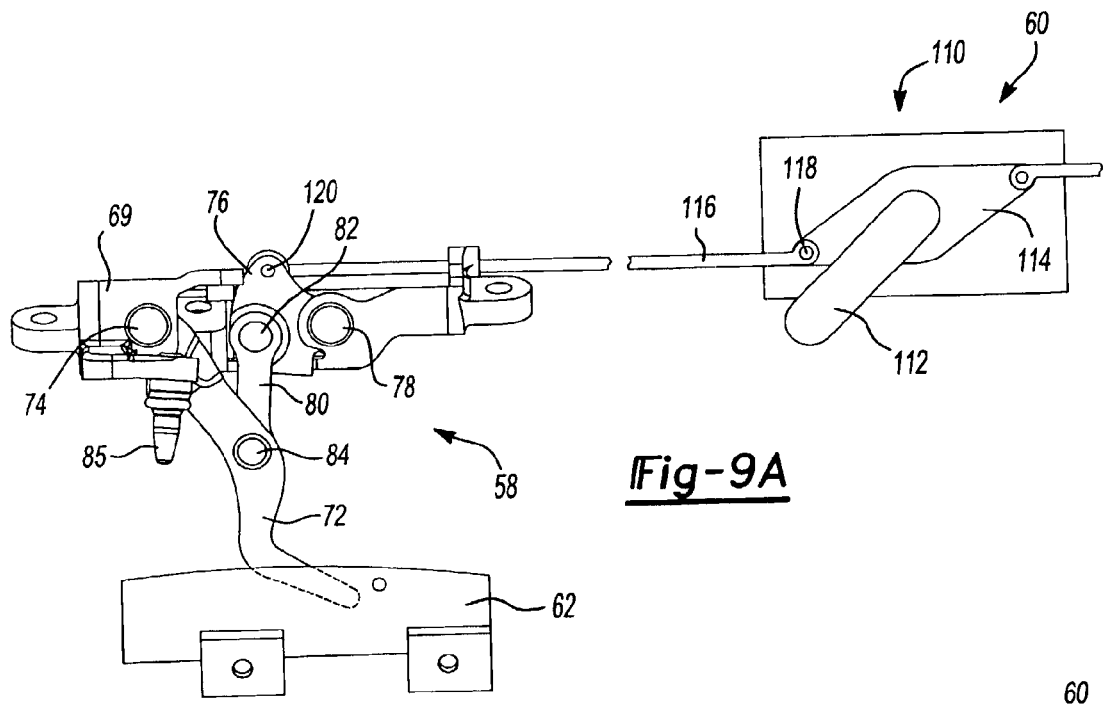
FIGS. 9A–B are perspective views of the manually operated convertible top latch of FIG. 8 in an unlatched (open) and latched (closed) position respectively.
Figure 9B:
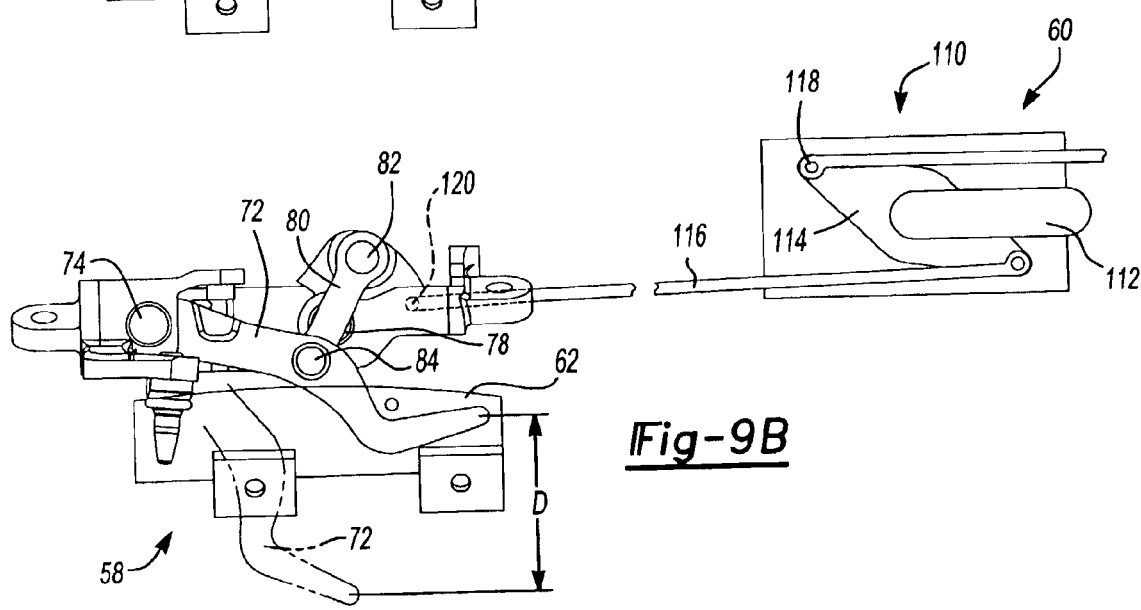
Figure 10:
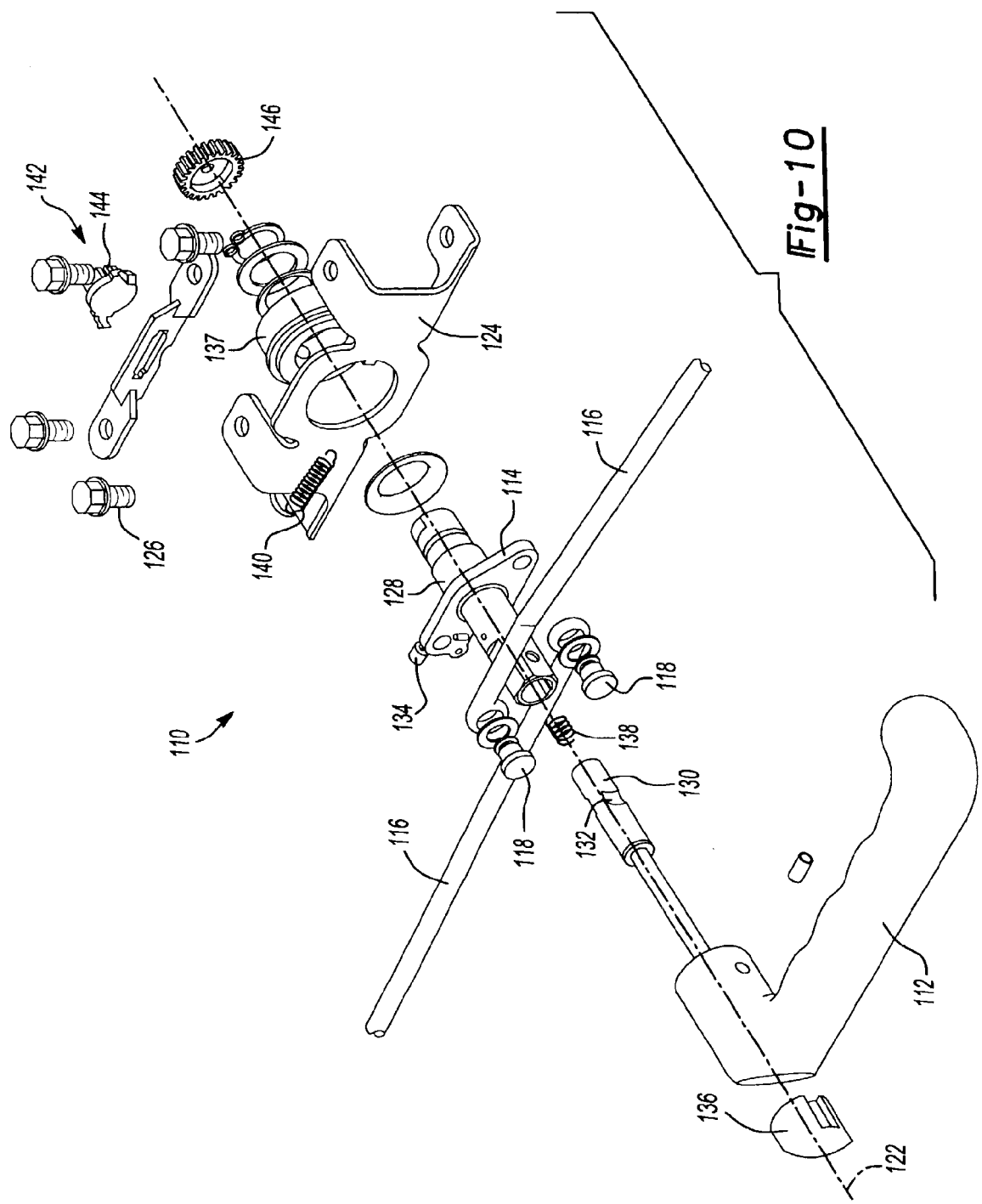
FIG. 10 is an exploded perspective view of the manually operated handle assembly of FIG. 8.

Driving assembly 60 that drives latch assembly 58 can be either a powered driving assembly in the first preferred embodiment of the convertible top latch, as shown in FIGS. 4–7, or a manual driving assembly in the second preferred embodiment of the convertible top latch, as shown in FIGS. 8–10. That is, latch assembly 58 is interchangeable with a powered driving assembly or a manual driving assembly. Specifically, receptacle 62, latch member 72, and driving link 80 along with the geometry of latch assembly 58 remain the same regardless of latch assembly 58 being driven by a powered or manual driving assembly 60. Crank 76 will differ slightly, as described in more detail below, depending upon whether latch assembly 58 is being driven by powered or manual driving assembly 60. Additionally, bracket 69 is slightly different depending upon whether latch assembly 58 is being driven by a powered or manual driving assembly 60. However, the bolt pattern on bracket 69 will remain the same and will be mounted to the same location on the number one roof bow 28 regardless of whether latch assembly 58 is driven by a powered or manual driving assembly 60. By having the capability of utilizing the same bolt pattern for bracket 69, and using the same receptacle 62, latch member 72, driving link 80, and geometry, latch assembly 58 according to the principles of the present invention can fit within a common packaging envelope on number one roof bow 28 and header 62 of vehicle 22 regardless of latch assembly 58 being driven by a powered or manual driving assembly 60. Furthermore, the common design and interchangeability of the components of latch assembly 58 reduces the part count for latch assembly 58 which leads to cost savings in stocking, tracking, and ordering replacement parts for latch assembly 58.

A unique and novel aspect of latch assembly 58 according to the principles of the present invention utilizes a design that provides latch member 72 with a same travel distance D regardless of being driven by a powered or manual driving assembly 60. That is, latch assembly 58 can be used on a convertible roof 20 requiring a predetermined pull down distance D that can be accomplished by latch assembly 58 regardless of being driven by a powered or manual driving assembly 60. For example, predetermined distance D can be about 20 mm and latch member 72 can pull convertible roof 20 down about 20 mm regardless of being driven by a powered or manual driving assembly. In fact, the design of latch assembly 58 provides for a much greater pull down distance than theretofore available in manually driven latch assemblies. Specifically, latch member 72 is capable of moving a distance D of greater than about 50 mm when being driven by either a powered or manual driving assembly 60. This is accomplished while still maintaining the manual operating force required to manually drive latch assembly 58 within a reasonable magnitude. Thus, the interchangeable design and equivalent distance D latch member 72 undergoes to latch convertible roof 20 to vehicle 22 can be achieved without requiring excessive force or significantly differing mechanical arrangements.

Referring now to FIGS. 4–7, the first preferred embodiment of the convertible top latch is shown with latch assembly 58 being driven by a powered driving assembly 60. Powered driving assembly 60 includes an electric motor 92 that rotates a flexible cable 94 which is attached to latch assembly 58. Motor 92 is capable of rotating in clockwise and counterclockwise directions to move latch assembly 58 between an open and closed position. When latch assembly 58 is configured to be driven by a powered driving assembly 60, bracket 69 is configured to receive a lead screw 96 that rotates with rotation of flexible cable 94 and electric motor 92. A driving nut 98 is positioned on lead screw 96 and travels along the length of lead screw 96 as lead screw 96 rotates. Driving nut 98 rides along a track 99 on bracket 69 that prevents rotation of driving nut 98 as lead screw 96 rotates. As can best be seen in FIGS. 6A–B, driving nut 98 has a roller 100 that travels linearly with driving nut 98 along the length of lead screw 96. Roller 100 engages with a cam surface 102 on a backside 104 of crank 76. Movement of roller 100 along cam surface 102 causes crank 76 to pivot about pivot 78 which causes latch assembly 58 to move between open and closed positions. Sensors 106, such as Hall effect sensors, are positioned on bracket 69 and detect the position of driving nut 98 on lead screw 96 and to provide feedback to a microprocessor (not shown) that controls operation of latch assembly 58. Crank 76, when designed to be driven by a powered driving assembly 60, also includes a biasing member 108 that biases crank 76 to rotate latch assembly 58 into the opened or unlatched position. Biasing member 108 can take a variety of forms. For example, biasing member 108 can be a spring, as shown. Spring 108, preferably, is a torsion spring that encircles pivot 78. Other locations for biasing member 108, however, can be employed. For example, biasing member 108 can be a compression spring that is positioned in a recess 109 on bracket 69 to facilitate unlatching of convertible roof 20 from vehicle 22. Biasing member 108 also allows latching member 72 to be dry cycled (manually rotated up and down) and to engage receptacle 62 as the convertible roof 20 is lowered to header 63 without activating drive assembly 60.

FIGS. 7A–C show operation of latch assembly 58 when driven by an automatically powered driving assembly 60. Top stack mechanism 24 is operated to position latch assembly 58 immediately above receptacle 62 with a portion of latch member 72 positioned below pin 68. Electric motor 92 is then operated to rotate flexible cable 94 which rotates lead screw 96. Rotation of lead screw 96 causes driving nut 98 to move from right to left (for the orientation shown in FIGS. 7A–C). Movement of driving nut 98 to the left causes crank 76 to rotate counterclockwise about pivot 78. Counterclockwise rotation of crank 76 about pivot 78 causes driving link 80 to drive latch member 72 pivotably about pivot 74 in a clockwise direction thus causing latch member 72 to engage with pin 68 and pull convertible roof 20 toward receptacle 62 and header 63. When driving nut 98 has traveled a sufficient distance, latch assembly 58, as shown in FIG. 7C, completely latches convertible roof 20 to vehicle 22. In the closed position, driving link 80 is positioned substantially on-center with crank 76. That is, a line connecting the two pivots 82 and 84 of driving link 80 crosses substantially through pivot 80 about which crank 76 rotates. The on-center positioning of driving link 80 when latch assembly 58 is in the closed position, results in little or no residual load on roller 100 and cam surface 102 when in the latched position. Alternatively, driving link 80 can be positioned near on-center with crank 76 when latch assembly 58 is in the closed position.

To unlatch convertible roof 20 from vehicle 22, electric motor 92 is rotated in an opposite direction which causes lead screw 96 via flexible cable 94 to also rotate in an opposite direction. This rotation of lead screw 96 causes driving nut 98 to move from left to right (for the orientation shown in FIGS. 7A-C) and roller 100 to move away from cam surface 102. Biasing member 108 and/or load on latch member 72 from top stack mechanism 24 then causes crank 76 to rotate clockwise which causes driving link 80 to push latch member 72 counterclockwise about pivot 74. Counterclockwise rotation of latch member 72 about pivot 74 causes latch member 72 to disengage from pin 68 in receptacle 62 and unlatches convertible roof 20 from vehicle 22. Thus, latch assembly 58 can be operated by a powered driving assembly 60 to latch convertible roof 20 to vehicle 22.

Referring now to FIGS. 8–9, the second preferred embodiment of the convertible top latch is shown with latch assembly 58 being driven by a manual driving assembly 60. When latch assembly 58 is configured to be driven by a manual driving assembly 60, bracket 69 does not need to have openings to accommodate lead screw 96, driving nut 98, nor anti-rotation track 99, and roller 100. Additionally, crank 76 does not need cam surface 102 nor biasing member 108 to bias crank 76 to a specific orientation. Manual driving assembly 60 includes a handle assembly 110 having a handle 112 and a crank 114 that rotates with the rotation of handle 112. One end of a connecting rod 116 is pivotably connected to crank 114 at pivot 118 while an opposite end of connecting rod 116 is pivotably coupled to crank 76 at pivot 120. Rotation of handle 112 rotates crank 114 about axis 122 and causes connecting rod 116 to move toward or away from latch assembly 58 depending upon the direction rotation of handle 112. Movement of connecting rod 116 toward and away from latch assembly 58 causes crank 76 to rotate about pivot 78. Rotation of crank 76 about pivot 78, as discussed above with reference to the powered driving assembly, causes latch member 72 to rotate about pivot 74 and latch and unlatch convertible roof 20 from vehicle 22, as shown in FIGS. 9A–B.

As can be seen in FIG. 9B, when latch assembly 58 is driven by manual driving assembly 60, the closed or latched position of latch 58 corresponds to driving link 80 being over center of crank 76 to provide a locking feature of latch assembly 58 when latching convertible roof 20 to vehicle 22. The over center feature in conjunction with the push button lock of handle assembly 110, described below, provides redundant locking of latch assembly 58 in the latched or closed position. As can be seen in FIGS. 9A and 9B, operation of the latch assembly 58 by manual driving assembly 60 causes latch member 72 to move through a predetermined distance D which is the same as that available when being driven by a powered driving assembly discussed above.

FIG. 10 illustrates an exploded view of handle assembly 110. A bracket 124 is configured to be attached to number one roof bow 28 via bolts 126 or other similar type fasteners, such as rivets. Crank 114 has a shaft 128 that extends on either side of crank 114. One end of shaft 128 fits through an opening in bracket 124 while an opposite end of shaft 128 is attached to handle 112. Shaft 128 has an opening in the interior through which an extension 130 of handle 112 resides. Extension 130 is movable relative to handle 112 and has a recess 132 that engages with a pin 134 to lock handle 112 in a fixed orientation. A push button 136 is located on handle 112 opposite extension 130. Depression of button 136 causes extension 130 to move toward crank 114 which allows recess 132 to disengage pin 134 from housing 137 and handle 112 to be rotated. A biasing member 138, such as a spring, biases extension 130 toward handle 112 to automatically lock handle 112 when oriented in a specific position, for example, when oriented in a position corresponding to latch assembly 58 being closed.

Crank 114 is biased to a specific position by a biasing member 140, such as a spring. Spring 140 can be attached to bracket 124 and crank 114 to bias crank 114 in a position corresponding to either a latched or unlatched position of latch assembly 58. In the configuration shown, spring 140 is configured to bias handle assembly 110 to a position corresponding to latch assembly 58 being in a closed position. In addition to facilitating rotation of handle assembly 110 to a position corresponding to latching convertible roof 20 to vehicle 22 biasing spring 140 also provides additional benefits. For example, biasing spring 140 provides an automatic return or automatic retraction of handle 112 to a retracted or stowed position. In other words, when it is desired to move convertible roof 20 from an extended to a retracted position, handle 112 is rotated to unlatch convertible roof 20 from vehicle 22. Top stack mechanism 24 is then operated to cause convertible roof 20 to move to its retracted position. Upon release of handle 112, biasing spring 140 causes handle 112 to automatically retract back to its stowed position which corresponds to latch assembly 58 being in a closed or latching position. The automatic retraction of handle 112 ensures that handle 112 is closely packaged against number one roof bow 28 and minimizes the required packaging envelope to store convertible roof 20 in the retracted position. In other words, if handle 112 does not self-retract, the packaging envelope for storing convertible roof 20 in the retracted position must take in account the possibility that handle 112 will be in an extended or non-retracted position when convertible roof 20 is being stowed and, thus, accommodate this additional packaging space requirement.

Handle assembly 110 can also be provided with a damping member 142. Damping member 142 dampens the movement of handle assembly 110 about axis 122. Such damping can be beneficial when used in conjunction with a biasing member 140 to allow handle 112 to self-retract without snapping or moving back to the retracted position at a high rate of speed. Thus, damping member 142 in conjunction with biasing member 140 can provide controlled self-retraction of handle 112. Damping member 142 can take a variety of forms. For example, as shown in FIG. 10, damping member 142 can have a dampened gear 144 that is complementary to a gear 146 on the end of shaft 128. The engagement between gear 146 and damping gear 144 allows damping member 142 to limit or reduce the rate at which handle 112 rotates about axis 122. Furthermore, damping member 142 can be configured to provide dampening of rotation of handle 112 about axis 122 in a clockwise direction, counterclockwise direction or in both directions.

Figure 11:
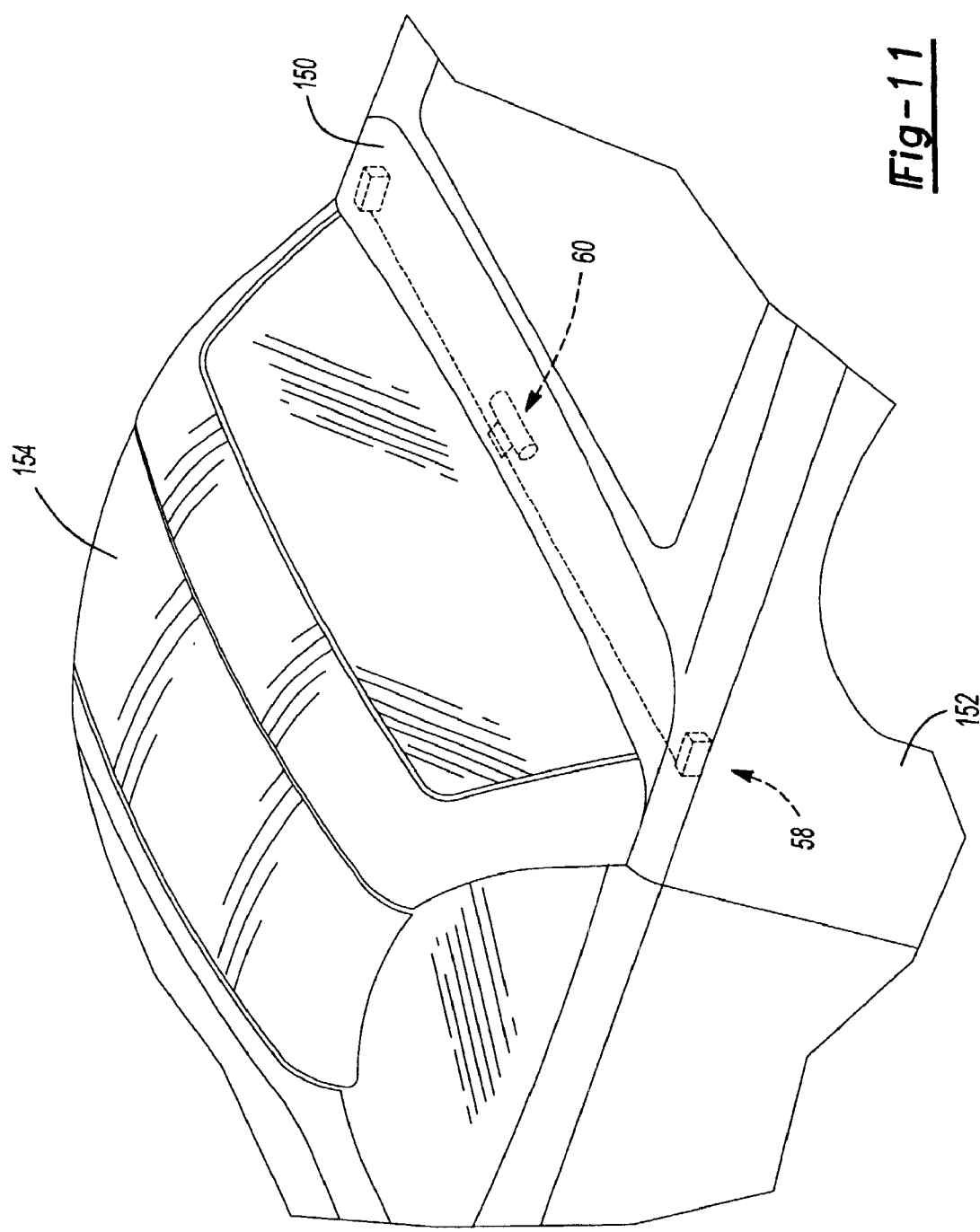
FIG. 11 is an alternate embodiment of the convertible top latch according to the principles of the present invention on a tonneau cover.

In an alternate embodiment, as shown in FIG. 11, latch assembly 58 and driving assembly 60 are used to latch a tonneau cover 150 to vehicle 152. Vehicle 152 has a hard top convertible roof 154. Tonneau cover 150 covers a stowage compartment (not shown) and moves between open and closed positions to allow convertible roof 154 to be retracted into and extended out of the stowage compartment. The actuating mechanism for moving tonneau cover 150 between the open and closed positions can be that disclosed in U.S. Pat. No. 5,743,587 entitled "Apparatus For Use In An Automotive Vehicle Having A Convertible Roof System" which issued to Alexander et al. the disclosure of which is incorporated herein by reference. While latch assembly 58 and driving assembly 60 are shown as being used on a tonneau cover on a vehicle with a hard top convertible roof, it should be understood that latch assembly 58 and driving assembly 60 can also be used on a tonneau cover on a vehicle with a soft top convertible roof.

While various aspects of the preferred embodiments of latch assembly 58 and driving assembly 60 have been disclosed, it should be appreciated that various other embodiments may be employed in combination with the present invention. For example, the latch, links or other components may have differing shapes. Furthermore, additional links may be employed as long as the same movement of latch member 72 is achieved. Moreover, it is also envisioned that latch assembly 58 and driving assembly 60 can be mounted to the stationary front header 63 of vehicle 22 for engaging a number one roof bow mounted receptacle 62. Additionally, latch assembly 58 and driving assembly 60 can be used to secure a rearmost roof bow to a tonneau cover panel or quarter panel. While various materials and dimensions have been disclosed, other materials and dimensions can be readily used. It is intended by the following claims to cover these and any other departures from the disclosed embodiments which fall within the true spirit of this invention.

What is claimed is:

1. A convertible roof apparatus comprising:
   a linkage assembly moving between open and closed positions, said linkage assembly comprising:
   a fixed member;
   a latching member pivotally attached to said fixed member;
   a crank pivotally connected to said fixed member; and
   a drive link pivotally attached to said crank and pivotally attached to said latching member with movement of said crank causing said drive link to move said latching member; and
   a driving member operable to drive said linkage assembly between said open and closed positions.

2. The apparatus of claim 1, wherein said driving member is a manually operated handle assembly comprising:
   a connecting member having first and second ends, said first end being pivotally attached to said linkage assembly with movement of said connecting member driving said linkage assembly;
   a rotating member operable to rotate about an axis, said second end of said connecting member being attached to said rotating member offset from said axis, rotation of said rotating member about said axis causing said connecting member to move; and
   a lever operable to rotate said rotating member about said axis in response to movement of said lever.

3. The apparatus of claim 2, wherein said handle assembly further comprises a biasing member that biases said lever to a position corresponding to said linkage assembly being in said closed position.

4. The apparatus of claim 1, wherein said driving member drives said crank.

5. The apparatus of claim 1, wherein said crank has a cammed surface and said driving member comprises a rolling member operable to travel along said cammed surface and cause said crank to pivot.

6. The apparatus of claim 5, wherein said driving member further comprises:
   a lead screw operable to rotate and drive said linkage assembly;
   a drive nut on said lead screw and moving along said lead screw in response to rotation of said lead screw; and
   wherein said rolling member is attached to said drive nut, moves with movement of said drive nut and drives said linkage assembly.

7. The apparatus of claim 6, wherein said lead screw is rotated by an electric motor.

8. The apparatus of claim 5, further comprising a biasing member that biases said linkage assembly to said open position.

9. The apparatus of claim 1, wherein said drive link is substantially on-center when said linkage assembly is in said closed position.

10. The apparatus of claim 1, wherein said drive link is over-center when said linkage assembly is in said closed position.

11. A convertible roof apparatus comprising:
   a top stack mechanism having a forwardmost roof bow and operable between retracted and extended positions;
   a linkage assembly moving between open and closed positions, at least one link of said linkage assembly being substantially between said open position and a substantially on-center position inclusive with respect to another link of said linkage assembly when said linkage assembly is in said closed position; and
   a driving member operable to drive said linkage assembly between said open and closed positions.

12. The apparatus of claim 11, wherein said linkage assembly comprises:
   a fixed member;
   a latching member pivotally attached to said fixed member;
   a crank pivotally connected to said fixed member; and
   a drive link pivotally attached to said crank and pivotally attached to said latching member with movement of said crank causing said drive link to move said latching member.

13. The apparatus of claim 12, wherein said drive link is substantially on-center with said pivotal connection between said crank and said fixed member when said linkage assembly is in said closed position.

14. The apparatus of claim 11, wherein said driving member is an automatically powered driving member.

15. The apparatus of claim 11, wherein said driving member is a screw drive.

16. The apparatus of claim 11, wherein said at least one link is substantially on-center with respect to said another link when said linkage assembly is in said closed position.

17. An automotive convertible roof latching apparatus comprising:
   a multi-link assembly movable between open and closed positions; and
   a driving mechanism operable to drive said multi-link assembly between said open and closed positions;
   said multi-link assembly including;
   at least one link having a length that is adjustable; and
   a latching member having a latching end and at least one pivot, said latching member having a fixed length between said latching end and one of said pivots.

18. The apparatus of claim 17, wherein said multi-link assembly comprises:
   a fixed member;
   a latching member pivotally attached to said fixed member;
   a crank pivotally connected to said fixed member; and
   a drive link pivotally attached to said crank and pivotally attached to said latching member with movement of said crank causing said drive link to move said latching member.

19. The apparatus of claim 18, wherein said drive link has a length which is adjustable.

20. The apparatus of claim 17, wherein said at least one link having a length that is adjustable comprises:
   an elongated member having opposite ends; and
   a pair of fittings disposed on said ends of said elongated member and separated by a distance, and said distance between said fittings being adjustable.

21. The apparatus of claim 20, wherein a depth said ends of said elongated member extend into said fittings is adjustable.

22. The apparatus of claim 20, wherein said ends of said elongated member are threaded, said fittings have complementary threaded recesses into which said ends of said elongated member extend, and rotation of said elongated member relative to said fittings varies said distance between said fittings.

23. The apparatus of claim 17, wherein said driving mechanism is an automatically powered driving mechanism.

24. The apparatus of claim 17, wherein said driving mechanism is manually operated driving mechanism.

25. The apparatus of claim 17, wherein said driving mechanism is a screw drive mechanism.

26. A convertible top system for an automotive vehicle, the convertible top comprising:
    a cover assembly operable between opened and closed positions;
    an interchangeable actuator including one of an automatically powered actuator and a manual actuator; and
    a latch assembly operably moving between open and closed positions and operable to latch said cover assembly in said closed position, said latch assembly having a latching member and at least one link that are commonly employed when said latch assembly is operated by either said automatically powered actuator or said manual actuator, and both said automatically powered actuator and said manual actuator impart a same direction of force input to drive said latch assembly between said open and closed positions.

27. The convertible top of claim 26, wherein said latching member moves a predetermined distance that is the same when said latch assembly is operated by either said automatically powered actuator or said manual actuator.

28. The convertible top of claim 27, wherein said predetermined distance is greater than about 20 mm.

29. The convertible top of claim 28, wherein said predetermined distance is greater than about 50 mm.

30. The convertible top of claim 26, wherein said latch assembly is a four bar linkage.

31. The convertible top of claim 30, wherein each link of said four bar linkage is commonly employed when said latch assembly is operated by either said automatically powered actuator or said manual actuator.

32. The convertible top of claim 26, wherein said cover assembly is a convertible roof.

33. The convertible top of claim 26, wherein said cover assembly includes a roof bow with said latch assembly mounted to said roof bow.

34. The convertible top of claim 26, wherein said cover assembly is a tonneau cover.

35. A convertible top for an automotive vehicle, the convertible top comprising:
    a top stack mechanism having a forwardmost roof bow and operable between retracted and extended positions;
    an interchangeable actuator including one of an automatically powered actuator and a manual actuator; and
    a latch assembly operably moving between open and closed positions to latch said top stack mechanism in said extended position, said latch assembly having a latching member that a moves a predetermined distance when said latch assembly moves between said open and closed positions, and said predetermined distance being the same when said latch assembly is operated by either said automatically powered actuator or said manual actuator.

36. The convertible top of claim 35, wherein said predetermined distance is greater than about 20 mm.

37. The convertible top of claim 36, wherein said predetermined distance is greater than about 50 mm.

38. The convertible top of claim 35, wherein said latch assembly is a four bar linkage.

39. A method of latching a cover assembly of a convertible roof system with a linkage assembly comprising:
    (a) rotating a crank member of the linkage assembly that is pivotally attached to a fixed member of the linkage assembly;
    (b) moving a driving link of the linkage assembly that is pivotally attached to said crank member in response to rotation of said crank member;
    (c) rotating a latching member of the linkage assembly that is pivotally attached to said fixed member and pivotally attached to said driving link in response to movement of said driving link; and
    (d) engaging a latching member retainer with said latching member in response to rotating said latching member thereby latching the cover assembly.

40. The method of claim 39, wherein step (a) further comprises rotating said crank member by moving a rolling member that travels along a cammed surface on said crank member.

41. The method of claim 40, wherein step (a) further comprises moving said rolling member by rotating a lead screw.

42. The method of claim 41, wherein step (a) further comprises moving said rolling member with a drive nut on said lead screw that moves along said lead screw in response to rotation of said lead screw.

43. The method of claim 42, wherein step (a) further comprises rotating said lead screw with an electric motor.

44. The method of claim 39, wherein step (a) further comprises rotating said crank member by manually rotating a handle coupled to said crank member.

45. The method of claim 39, wherein step (b) further comprises moving said driving link to a substantially on-center position when latching the cover assembly.

46. The method of claim 39, wherein step (b) further comprises moving said driving link to an over-center position when latching the cover assembly.

47. The method of claim 39, wherein the cover assembly is a convertible roof.

48. The method of claim 39, wherein the cover assembly is a tonneau cover.

49. The apparatus of claim 11, wherein said another link pivots about a relatively fixed pivot and said at least one link is substantially between said open position and a substantially on-center position inclusive with respect to said fixed pivot of said another link of said linkage assembly when said linkage assembly is in said closed position.

50. An automotive convertible roof latching apparatus comprising:
    a multi-link assembly movable between open and closed positions; and
    a driving mechanism operable to drive said multi-link assembly between said open and closed positions;
    said multi-link assembly including an adjustable link and at least two other links, said adjustable link being pivotally connected to said two other links at two pivots, and a length of said adjustable link between said two pivots is adjustable.

51. An automotive convertible roof latching apparatus comprising:
    a multi-link assembly movable between open and closed positions; and
    a driving mechanism operable to drive said multi-link assembly between said open and closed positions;
    said multi-link assembly including at least one pivot and at least one link having a length that is adjustable,
    wherein adjustment of said length of said at least one link alters a location of a pivot of said multi-link assembly.

52. A convertible top system for an automotive vehicle, the convertible top comprising:
    a cover assembly operable between opened and closed positions;
    an interchangeable actuator including one of an automatically powered actuator and a manual actuator; and
    a latch assembly operably moving between open and closed positions and operable to latch said cover assembly in said closed position, and said latch assembly having a latching member and at least one link that are commonly employed when said latch assembly is operated by either said automatically powered actuator or said manual actuator, wherein said latch assembly is driven by only one of said automatically powered actuator and said manual actuator.

53. A convertible top system for an automotive vehicle, the convertible top comprising:
- a cover assembly including a cover operable between opened and closed positions;
- a single interchangeable actuator including one of an automatically powered actuator and a manual actuator; and
- a latch assembly operably moving between open and closed positions and operable to latch said cover in said closed position, and said latch assembly having a latching member and at least one link that are commonly employed when said latch assembly is operated by either said automatically powered actuator or said manual actuator, wherein said single actuator is substantially centrally located relative to said cover in a cross-vehicle orientation and said latch assembly includes a pair of latching members that move in a cross-vehicle direction when moving between said open and closed positions.

* * * * *